United States Patent
Hui et al.

(10) Patent No.: US 11,050,257 B2
(45) Date of Patent: Jun. 29, 2021

(54) POWER SUPPLY SUPPORTING VIRTUAL INERTIA FOR GRID CONTROL (MICRO-SPRING CONVERTER)

(71) Applicant: The University of Hong Kong, Hong Kong (CN)

(72) Inventors: Shu Yuen Ron Hui, Hong Kong (CN); Eberhard Waffenschmidt, Aachen (DE)

(73) Assignee: THE UNIVERSITY OF HONG KONG, Hong Kong (CN)

( * ) Notice: Subject to any disclaimer, the term of this patent is extended or adjusted under 35 U.S.C. 154(b) by 167 days.

(21) Appl. No.: 16/071,665

(22) PCT Filed: Jan. 20, 2017

(86) PCT No.: PCT/CN2017/071889
§ 371 (c)(1),
(2) Date: Jul. 20, 2018

(87) PCT Pub. No.: WO2017/125067
PCT Pub. Date: Jul. 27, 2017

(65) Prior Publication Data
US 2019/0036335 A1      Jan. 31, 2019

Related U.S. Application Data

(60) Provisional application No. 62/286,071, filed on Jan. 22, 2016.

(51) Int. Cl.
*H02J 3/28*       (2006.01)
*H02J 7/00*       (2006.01)
*H02J 3/32*       (2006.01)
*H02J 7/34*       (2006.01)

(52) U.S. Cl.
CPC .................. *H02J 3/28* (2013.01); *H02J 3/32* (2013.01); *H02J 7/0068* (2013.01); *H02J 7/345* (2013.01)

(58) Field of Classification Search
USPC ........................................................... 307/19
See application file for complete search history.

(56) References Cited

U.S. PATENT DOCUMENTS

| 7,541,690 B2 * | 6/2009 | Kobayashi | ............. H05B 47/18 |
| | | | 307/19 |
| 2011/0148205 A1 * | 6/2011 | Moon | ........................ H02J 3/32 |
| | | | 307/65 |

(Continued)

FOREIGN PATENT DOCUMENTS

| CN | 102437628 A | 5/2012 |
| CN | 102570560 A | 7/2012 |

(Continued)

OTHER PUBLICATIONS

International Search Report dated Apr. 18, 2017 in International Application No. PCT/CN2017/071889, filed Jan. 20, 2017.

(Continued)

*Primary Examiner* — Rexford N Barnie
*Assistant Examiner* — Xuan Ly
(74) *Attorney, Agent, or Firm* — Saliwanchik, Lloyd & Eisenschenk

(57) ABSTRACT

A consumer product electric power supply is provided and includes a grid power converter that is coupled to a power grid; an energy storage element that is coupled to the grid power converter, which provides an intermediate voltage to the energy storage element; a load power converter that is coupled to the energy storage element and provides constant power to a load; and a power controller that measures a state variable of the grid, wherein the power controller controls the grid power converter based on the state variable of the grid to help stabilize the grid.

17 Claims, 5 Drawing Sheets

(56) References Cited

U.S. PATENT DOCUMENTS

| | | | | |
|---|---|---|---|---|
| 2012/0010751 A1* | 1/2012 | Kallioniemi | ............ | B66B 1/302 |
| | | | | 700/275 |
| 2013/0322139 A1 | 12/2013 | Lee et al. | | |
| 2016/0006242 A1* | 1/2016 | Yamada | ............... | H02M 7/04 |
| | | | | 307/65 |
| 2017/0005473 A1* | 1/2017 | Somani | ............... | H02J 3/381 |

FOREIGN PATENT DOCUMENTS

| | | | |
|---|---|---|---|
| CN | 102790422 A | | 11/2012 |
| CN | 103904671 | * | 7/2014 |
| CN | 103904671 A | | 7/2014 |

OTHER PUBLICATIONS

Conrad-Electronik, "Electrolytic Capacitors", Internet, Jul. 6, 2014, 11 pages.

"The Basics of Active Power Factor Correction", Web page <http://www.powerfactor.us/active.html>, 3 pages, Apr. 22, 2017, retrieved from Internet Archive Wayback Machine <https://web.archive.org/web/20170422011143/http://www.powerfactor.us/active.html> on Oct. 1, 2018, Lazar Rozenblat.

"Global Perspective on the Integration of Renewable Energy into the Grid", Aug. 2015, 9AAF-14:108 pages, Frost & Sullivan.

Agricola, A. et al., "dena-Studie Systemdienstleistungen 2030." Feb. 11, 2014, Final report:310 pages, Deutsche Energie-Agentur GmbH (dena), Berlin, Germany, along with its English translation.

Chen, Y. et al., "Improving the Grid Power Quality Using Virtual Synchronous Machines", *Proceedings of the 2011 International Conference on Power Engineering, Energy and Electrical Devices*, May 2011, 6 pages, IEEE, Torremolinos (Málaga), Spain.

Brisebois, J. et al., "Wind Farm Inertia Emulation to Fulfill Hydro-Québec's Specific Need", *2011 IEEE Power and Energy Society General Meeting*, 2011, 7 pages, IEEE.

Visscher, K. et al., "Virtual Synchronous Machines (VSG's) for Frequency Stabilisation in Future Grids With a Significant Share of Decentralized Generation", *CIRED Seminar 2008: SmartGrids for Distribution*, Jun. 23-24, 2008, Paper 0118:1-4, Frankfurt.

\* cited by examiner

POWER SUPPLY SUPPORTING VIRTUAL INERTIA FOR GRID CONTROL (MICRO-SPRING CONVERTER)

CROSS-REFERENCE TO RELATED APPLICATIONS

This application is the U.S. national stage application of International Patent Application No. PCT/CN2017/071889, filed Jan. 20, 2017, which claims priority to U.S. Provisional Application Ser. No. 62/286,071, filed Jan. 22, 2016, the disclosures of each of which are incorporated herein by reference in their entirety.

BACKGROUND OF THE INVENTION

Electric power grids must be able to balance power generation and power consumption at all times. If there is a sudden increase in the power consumption load, there must be a corresponding immediate increase in the power delivered. Today, this is accomplished by a cascade of power balancing steps. First, additional power can be instantly delivered from the rotational inertia of conventional generators that supply the grid. This additional power production results in a decrease in the rotation rate of the grid generators as well as a corresponding decrease in the electric frequency of the grid. The reduced electric frequency is used as a control signal for the next step of the cascade, the primary power control (e.g. adding additional steam or fuel to increase generator output). In addition, as the frequency drops, frequency dependent loads such as electric motors also draw less power, further helping to stabilize the grid.

In future power grids it is expected that most of the power will be generated by decentralized renewable energy sources. Most of the power sources will feed in power using electronic inverters, which do not react the same way to load or frequency changes as the conventional generators of today. As renewable energy replaces conventional generators, there will be less availability of rotational inertia to immediately supply the extra power demand when the load on the grid increases [1]. In addition, more and more motors are using electronic inverters, which operate independent of the grid frequency and do not automatically reduce power consumption. Both of these trends lead to more and more difficulty controlling grid stability.

Proposals exist to add "virtual inertia" to the control of feed-in inverters [2] [3] [4] [5]. This method discharges an electric storage element, such as a battery or a capacitor, allowing the feed-in inverters to deliver additional power if frequency decays. However, existing feed-in inverters are not easily modified and will not be replaced anytime soon due to their cost and long lifetime. In addition, adding power storage to the grid is costly so it is beneficial to keep it to a minimum.

BRIEF SUMMARY OF THE INVENTION

To address the above mentioned problems, new methods, devices, and machinery are needed for replacing the cascade of power balancing steps that take place in conventional electric grids. The subject invention provides novel and advantageous electric power supplies that have virtual inertia control, as well as methods for compensating for changes in grid power demand. The electric power supplies of the subject invention may control power drawn from the grid, supply power to the grid, or control the amount of power given to the load, based on, for example, the grid frequency, the grid voltage, and the load demand. The electric load can be anything that consumes electricity and has the ability to store power (e.g., lamps with a lamp driver, motors with electronic inverters, IT-equipment with ac/dc converters, etc.). The subject invention has the benefit that many loads with their electric power supplies can each compensate for a fraction of sudden change in grid power demand. The present invention may be implemented through, for example, industry or government standards.

In one embodiment, an electric power supply for an electric load includes: a first electric power converter that is suitable for connecting to a power grid; an electric energy storage connected to the first electric power converter; and a second electric power converter connected to the electric storage and suitable for powering the electric load; wherein the first electric power converter is suitable for charging the electric energy storage using the power grid; and wherein the first electric power converter is controlled, at least in part, by a state variable of the power grid. In addition, the first electric power converter may be suitable for providing power to the grid by extracting power from the electric energy storage. Furthermore, the second electric power converter may be controlled, at least in part, by an amount of power required by the electric load and under some conditions may reduce the power being supplied to the load.

DETAILED DISCLOSURE OF THE INVENTION

The subject invention provides novel and advantageous electric power supplies that have virtual inertia control and methods of compensating for grid power demand. The subject invention can be beneficial for use in micro-grids, but also in future power grids that have a large proportion of renewable energy feed-in, as discussed above. An electric power supply can include a first electric power converter that is suitable for connecting to a power grid; an electric energy storage connected to the first electric power converter; and a second electric power converter connected to the electric storage and suitable for powering the electric load; wherein the first electric power converter is suitable for charging the electric energy storage using the power grid; and wherein the first electric power converter is controlled, at least in part, by a state variable of the power grid. The first electric power converter may also be suitable for providing power to the grid by extracting power from the electric energy storage. In summary, the first electric power converter has a double function, providing power factor correction and grid control. Furthermore, the second electric power converter may be controlled by a state variable of the grid in addition to the amount of power required by the electric load.

US Patent Application US 2013/0322139A1 ("Input AC voltage control bi-directional power converters") [6] discloses controlling a power converter connected to the grid based on the measured grid frequency and grid voltage for grid stabilization purposes. This converter may be connected to a dedicated storage device, which provides the energy needed for the power control. It may also be connected to a load device, but the load may experience power fluctuations because it is directly connected to the power converter. Therefore, the disadvantage of this solution is that it requires a dedicated storage device and it can result in fluctuations to load power, which is unacceptable for lighting and other critical loads.

Figure 1:
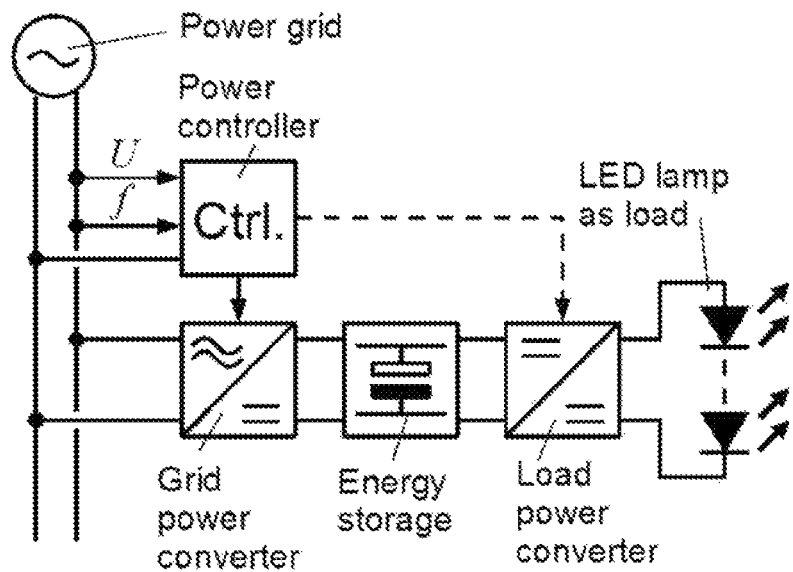
FIG. 1 is a schematic diagram of an embodiment of the present invention having two power stages, energy storage, and a grid state dependent control circuit.

FIG. 1 is a schematic diagram of an exemplary embodiment of the present invention. The power supply consists of a grid power converter, a load power converter, an LED lamp acting as a load, a power controller and an energy storage. The LED lamp is simply used an example and this invention could potentially be applied to the power supply of any load (e.g. motors with electronic inverters, IT-equipment with ac/dc converters, etc.). The load power converter is connected to the energy storage and has the capability of delivering constant power to the load. If the intermediate voltage at the energy storage drops, the load power converter has the ability to automatically increase its input current to maintain the power delivered to the load.

The energy storage may be an electrolytic capacitor (elcap), which is frequently used, or any other energy storage element. The energy storage can smooth out the ripple effect from alternating current supplied by the power grid after it has been rectified, as in a conventional power supply. In addition, the energy storage can store energy to act as virtual inertia for the grid. The grid power converter can include a rectifier and a dc-to-dc converter, preferably a boost converter. The grid power converter may also have the ability to supply power to the power grid by using the energy stored in the energy storage, possibly having a dc-to-ac converter to serve this function. Additionally, the grid power converter may provide power factor correction (PFC) functionality.

The grid power converter is controlled by the power controller. The power controller may control the PFC functionality of the grid power converter. Under normal operating conditions, the power controller may control the grid power converter so that the amount of power it provides is equal to the demand of the load. Additionally, in the subject invention, the power controller measures a state variable (e.g. voltage, frequency, grid frequency time derivative, voltage frequency time derivative, changes in voltage and/or frequency, etc.) of the grid and determines whether the grid power converter should increase the amount of power being drawn from the grid, decrease the amount of power being drawn from the grid, or even supply power to the grid. For example, the additional amount of power (or "control power") may be calculated according to Equation 2, below. Then, this additional amount of power may be added to the constant power (the power that the load requires), resulting in a current draw that corresponds to the new power demand. With this additional amount of power, the energy storage capacitor is charged or discharged.

For protection, if the intermediate voltage at the energy storage exceeds a maximum threshold or reduces below a minimum threshold, the control power may be set to zero in order to avoid damage to the circuit. Or, simply, all power supplied to the energy storage can be stopped.

In another embodiment, the control structure may be as follows. With no grid control power is applied, the intermediate voltage is kept constant by the power controller. The power controller then sets the actual current of the grid power converter based on the intermediate voltage set-point using a proportional—integral—derivative (PID) controller. With additional grid power control, the set-point of the intermediate voltage follows the grid frequency according to Equation 8, below. In this manner, the additional power automatically corresponds to the required virtual inertia power.

Figure 2:
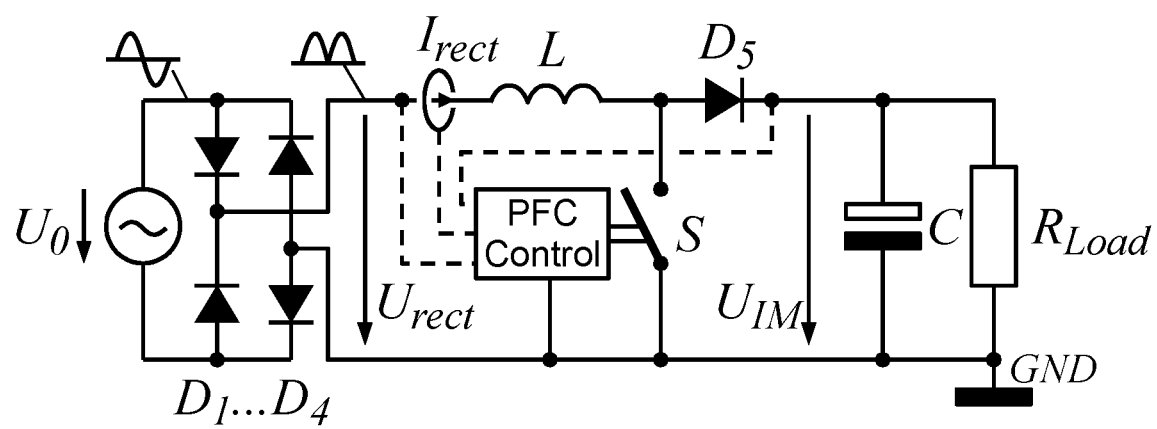
FIG. 2 is a schematic diagram of a conventional power factor correction circuit.
Figure 3:
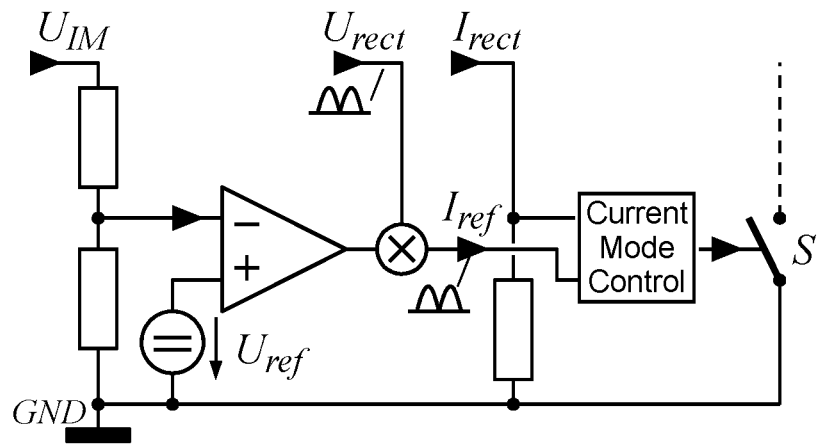
FIG. 3 is a schematic diagram illustrating a conventional PFC control circuit, as shown in FIG. 2.

A circuit diagram of a conventional power factor correction (PFC) circuit is depicted in FIGS. 2 and 3. Its function is well known (see, e.g., [8]). Referring to FIG. 2, voltage source $U_0$ represents the sinusoidal grid voltage. The diodes $D_1$ to $D_4$ provide rectification. Inductor L, diode $D_5$ and switch S form a boost converter. Switch S is typically a fast switching transistor, such as a MOSFET. Capacitor C provides buffering between the halve cycles of the sinusoidal voltage. Resistor $R_{Load}$ represents an arbitrary load. The PFC control has the task of providing a suitable duty cycle for the switching of switch S, such that the rectified current is sinusoidal and the voltage at intermediate voltage capacitor C remains constant.

FIG. 3 shows the details of the PFC control circuit of FIG. 2. A reference voltage $U_{ref}$ is subtracted from the intermediate voltage $U_{IM}$ and the result is amplified with a selected amplification factor using a first op-amp. This stage provides the control of the intermediate voltage $U_{IM}$ to a value proportional to $U_{ref}$. This result is multiplied with the rectified voltage $U_{rect}$ to obtain a reference signal $I_{ref}$ for the current mode control circuit. A pulse width modulation (PWM) signal is generated for the switch, such that $I_{rect}$ follows $I_{ref}$. A simple circuit for that purpose could be a comparator with hysteresis. If $I_{rect}$ is lower than $I_{ref}$, the comparator switches the switch on and the current rises. If it exceeds the hysteresis threshold, the switch is switched off and the current decreases.

Figure 4:
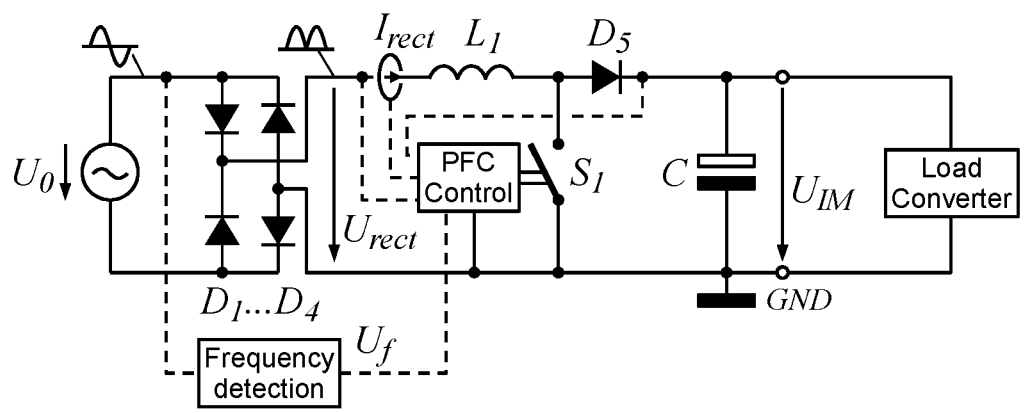
FIG. 4 is a schematic diagram of a power factor correction circuit with virtual inertia frequency control according to an embodiment of the present invention.

Another embodiment of the present invention is shown in FIG. 4. In the embodiment of FIG. 4, the PFC control circuit is extended to include a frequency detection circuit. This circuit provides an output voltage $U_f$ that is proportional to the measured grid frequency f and can be an analogue or digital circuit. The load is represented by a load converter. This converter is built such that it delivers constant power to the load, even if the intermediate voltage $U_{IM}$ varies.

Figure 5:
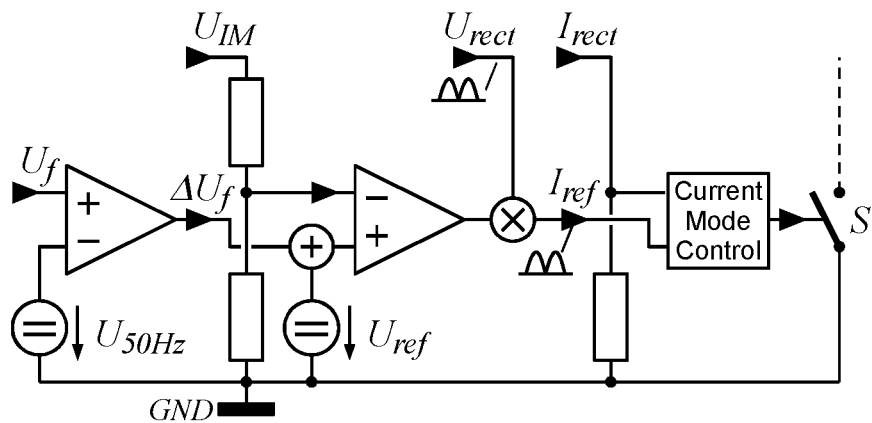
FIG. 5 is schematic diagram of the control circuit of the embodiment of FIG. 4.

FIG. 5 is schematic diagram of the control circuit of the embodiment of FIG. 4. A constant voltage corresponding to 50 Hz is subtracted from the voltage $U_f$ and this difference is amplified with a suitable factor by the left op-amp. The resulting voltage $\Delta U_f$ relates to the frequency deviation according to Equation 8. This signal is added to the reference voltage $U_{ref}$. As a result, the intermediate voltage follows a value corresponding to the sum of the reference voltage $U_{ref}$ plus the voltage $\Delta U_f$, representing the frequency change. It is in this manner that the circuit operates, adjusting the required power flow according to Equation 8.

Figure 6:
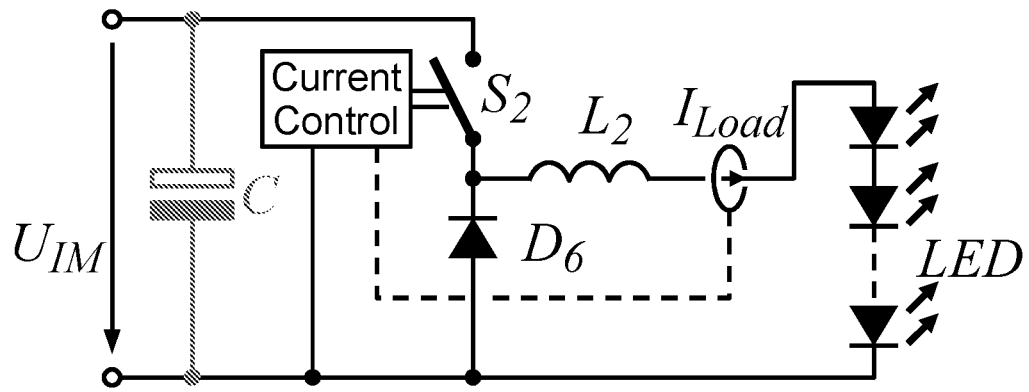
FIG. 6 is schematic diagram of an embodiment of the present invention that is able to provide constant power transmission to an LED load.

FIG. 6 is a schematic diagram of an embodiment of the present invention in which an LED (typically represented by a series of connected LEDs) is driven. Keep in mind, however, that the subject invention can be applied to the power supply of any load and an LED is merely an example. The circuit of FIG. 6 is a down converter with current control. The output current is kept constant using a current mode controller. Similar to the PFC circuit, several possibilities exist to realize the current control. In contrast to the PFC operation, a constant reference current value is used here. The constant output current leads to a constant output power, because the LED voltage remains constant. This allows the converter to transmit constant power, independent of the intermediate voltage $U_{IM}$.

Figure 7:
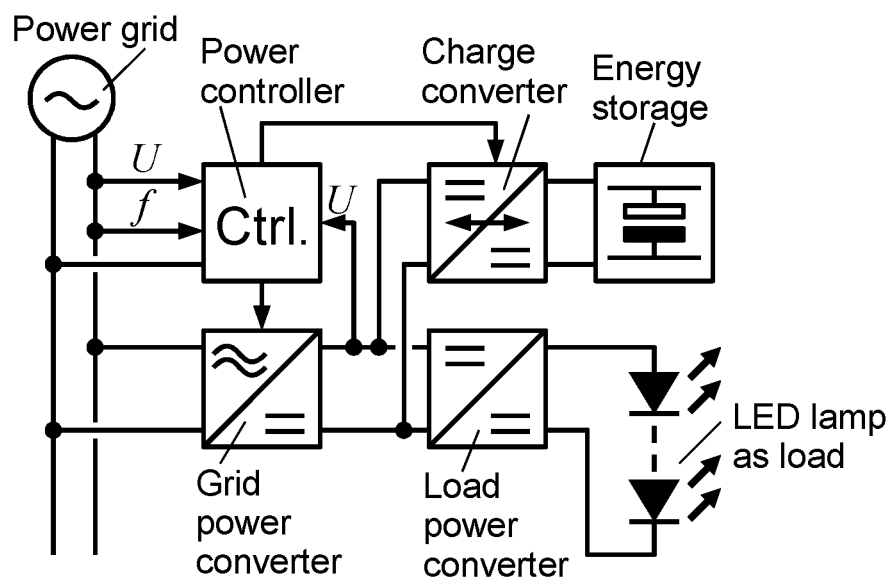
FIG. 7 is a schematic diagram of an embodiment of the present invention having two power stages and an additional charge converter.

In yet another embodiment of the present invention shown in FIG. 7, the energy storage (e.g. an elcap) is not directly connected to the intermediate voltage, but is connected by an additional charge converter. This converter is a bi-directional converter and can charge or discharge the energy storage capacitor. An advantage that is present in this embodiment is that the charge converter can discharge the energy storage to a much lower voltage than possible otherwise (i.e. if the energy storage was directly connected to the intermediate voltage). Therefore, in the embodiment shown in FIG. 7, the energy storage (e.g. a capacitor) can operate across a wider voltage range and has the potential to be reduced in size.

The charge converter only needs to process a small amount of control power and can therefore be small in comparison with the main power supply. The power flow of the charge converter is controlled directly by the power controller based on a state variable of the grid (e.g. the grid frequency, voltage, or changes in grid frequency or voltage). The grid power converter is independently controlled by the power controller to keep the intermediate voltage constant. That is, the power controller and the grid power converter can sense the amount of additional power required as the load changes and adjusts automatically. It is envisioned that the embodiment of FIG. 7 would be particularly beneficial for power converters that need no or only a small amount of intermediate energy storage, such as three phase converters or power supplies that can withstand a strong ripple on the intermediate voltage. In addition, the charge converter with energy storage and power controller of FIG. 7 can be added to an existing system. The existing power factor correction (PFC) circuit (operating as grid power converter) then performs its normal operation of keeping the intermediate voltage constant.

In a further aspect of this invention, the load power converter is designed such that it can reduce the power to the load. For example, this can be done in cases where there is an extreme energy demand by the grid (e.g., when the grid frequency or voltage falls below a certain threshold). This provides one more option to help stabilize the grid. In addition, the energy storage may be selected for not only for normal operation, but also for helping to compensate for extreme grid events. As shown in FIG. 1 with the dashed line from the power controller to the load power converter, the power controller is able to control the load power converter. In a simple implementation, the power controller reduces the power to the load if the grid frequency falls below a given threshold, which could be, e.g., 49.8 Hz in a European grid (compared to the nominal frequency of 50 Hz). In another implementation, the load power converter reduces the load power if the intermediate voltage at the energy storage reduces below a threshold.

In applying the present invention to a direct current (DC) grid, the grid voltage may be used as a control input (i.e. a measured state variable of the grid). In particular, with a grid having droop control, the grid voltage is good indicator of the power balance of the grid. A rising grid voltage indicates an excess of generated power, while a decay of the grid voltage indicates a lack of power. The grid power controller then needs to control the power according to the grid voltage time derivative instead of the grid frequency time derivative.

As previously mentioned, much of the proposed topology is already being used in today's power supplies. Usually, the first stage includes a rectifier, to change the AC current to DC current, and a converter operating as power factor correction (PFC) circuit and ensuring a sinusoidal input current. The second stage of the power supply generally includes a load power converter, which provides constant output power to the load. This functionality is required for many devices including, e.g., LED lamp drivers operating with over 25 Watts and even some lamp drivers operating at over 5 Watts. Furthermore, many power supplies contain energy storage in the form of an elcap, which maintains the intermediate voltage and smooths out the ripple caused by the alternating grid voltage. Therefore, to implement the present invention, little or no additional hardware would be required, and only the control mechanism of the first power stage would have to be modified. Since little to no hardware is would be required, it is envisioned that this invention could be easily and cost effectively added to existing power supplies. And, as power supplies of consumer products are replaced much more often than feed-in inverters, a transition to grid control without real rotating masses could be accomplished more easily by applying the present invention than by adding new feed-in inverters or by replacing or modifying existing feed-in inverters.

To get exemplary power and energy requirements and demonstrate the potential effectiveness of the subject invention, the methodology and data of reference [1] is used for the grid in Germany: a worst case event of a lack of 3 GW of power in the ENTSO-E grid is assumed. This requires 372 MW in the German grid. Assuming the primary control taking over with a linear increase within 20 s [1], this requires energy of 3720 MWs of instantaneous power to be delivered by the virtual inertia. Relating this to the peak demand of 80 GW leads to 4.6 W/kW, rounded up to 5 W/kW. Concluding, an additional 5 W of power and 50 Ws of energy per installed kW of power capacity are needed to cover one event.

Figure 8A:
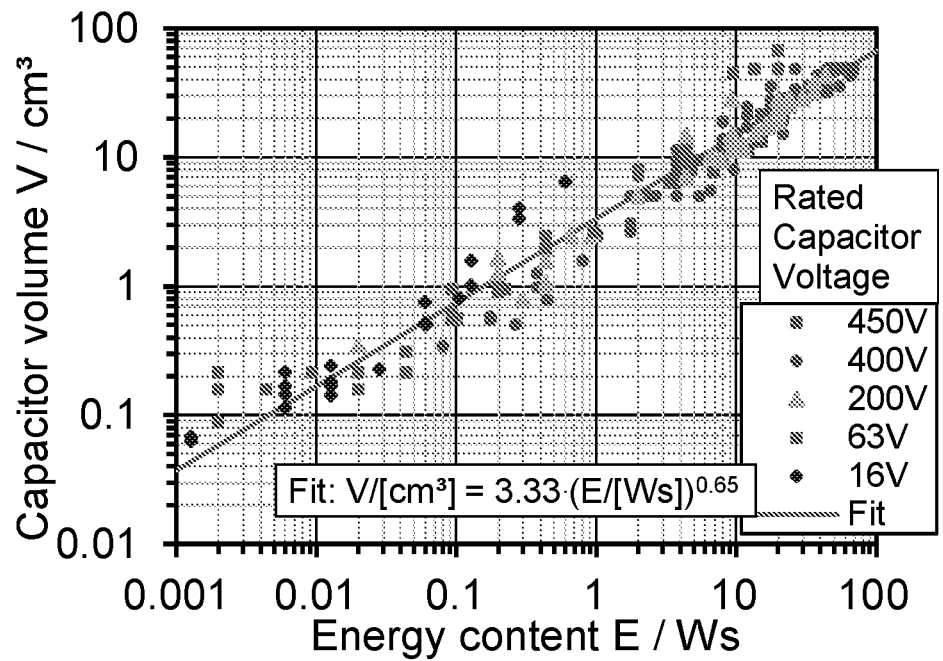
FIG. 8a is a graph illustrating capacitor energy content versus volume for various electrolytic capacitors.

Typically, the size of a capacitor relates to its maximum energy content $E_{max}$. To determine the interdependence, the capacity C, rated voltage $U_{max}$, diameter and height of 190 electrolytic capacitors have been collected from an electronic components distributor [7]. Rated energy $E_{max}$ and volume V are calculated from this data and shown in FIG. 8a. In real circuits, the maximum rated energy capability $E_{max}$ cannot be used because the capacitor is discharged from the maximum voltage $U_{max}$ by only the voltage difference $\Delta U$. Therefore, the usable energy $E_{use}$ is:

$$E_{use}=E_{max}\cdot[1-(1-\Delta U/U_{max})^2] \qquad (1)$$

Figure 8B:
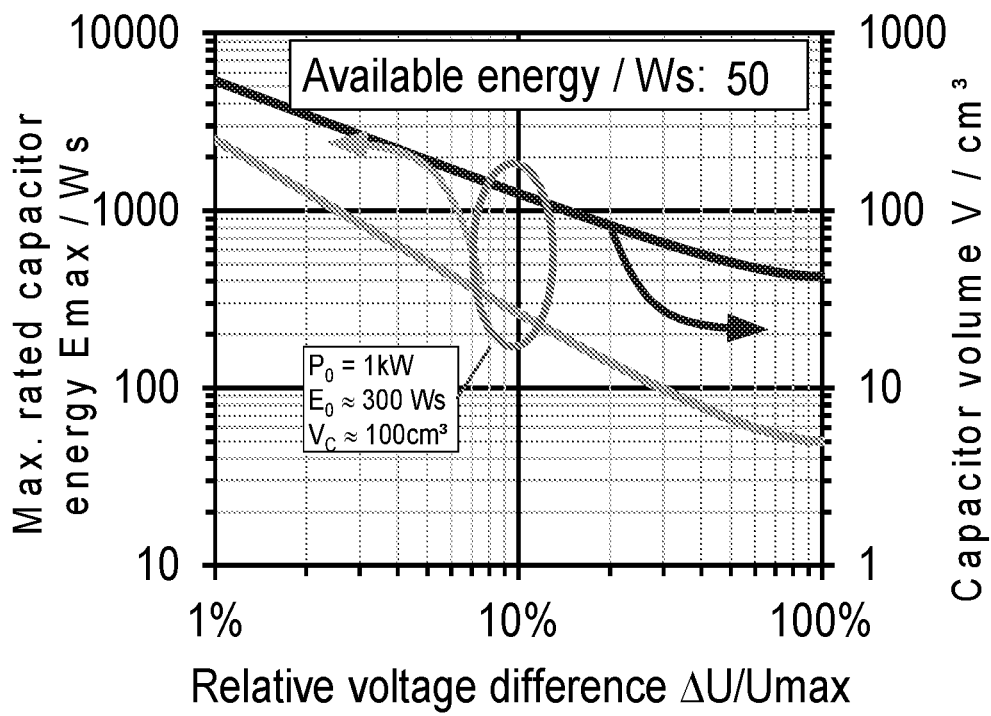
FIG. 8b is a graph illustrating the needed capacitor energy and volume size to store 50 Ws of energy.

Equation 1 is illustrated by the lower gray line in the graph of FIG. 8b, demonstrating what $E_{max}$ is necessary if the required energy of $E_{use}$=50 Ws is stored. The black curve is an extrapolation of the volume V using the fit function in FIG. 8a. The maximum voltage has no influence on the capacitor size and can thus be freely selected. Only the relative voltage difference, or the relative voltage ripple, determines the size. If a DC link capacitor is used, the ripple should remain below 10%, requiring at least 300 Ws of energy, resulting in capacitor volume size of about 130 cm$^3$ per installed kW. This size corresponds in its order of magnitude to the size of single phase DC link capacitors. However, keep in mind that the voltage step considered here pertains to a worst case scenario of an extreme power loss event.

During daily operation, much smaller deviations from the desired operation point are expected. In replacing virtual inertia, the required control power ΔP is dependent on the time derivative of the frequency deviation Δf from the nominal frequency $f_0$ (50 Hz):

$$\frac{\Delta P(t)}{P_0} = T_a \cdot \frac{d}{dt} \frac{\Delta f(t)}{f_0} \tag{2}$$

In Equation 2, $P_0$ is the nominal power of the system (in this case the power supply) and $T_a$ is a time constant. In the European power grid, this time constant ($T_a$) typically equals 20 s. ΔP is the power that can be drawn from the grid by the power supply in addition to the power needed by the load. If this value is negative, the power supply draws less power than required by the load, and thus "delivers" control power to the grid. A controller of the first power stage (i.e., the "power controller" or power grid converter) according to this invention can be designed to measure the time derivative of the grid frequency and control the additional power flow according to Equation 2.

Figure 9:
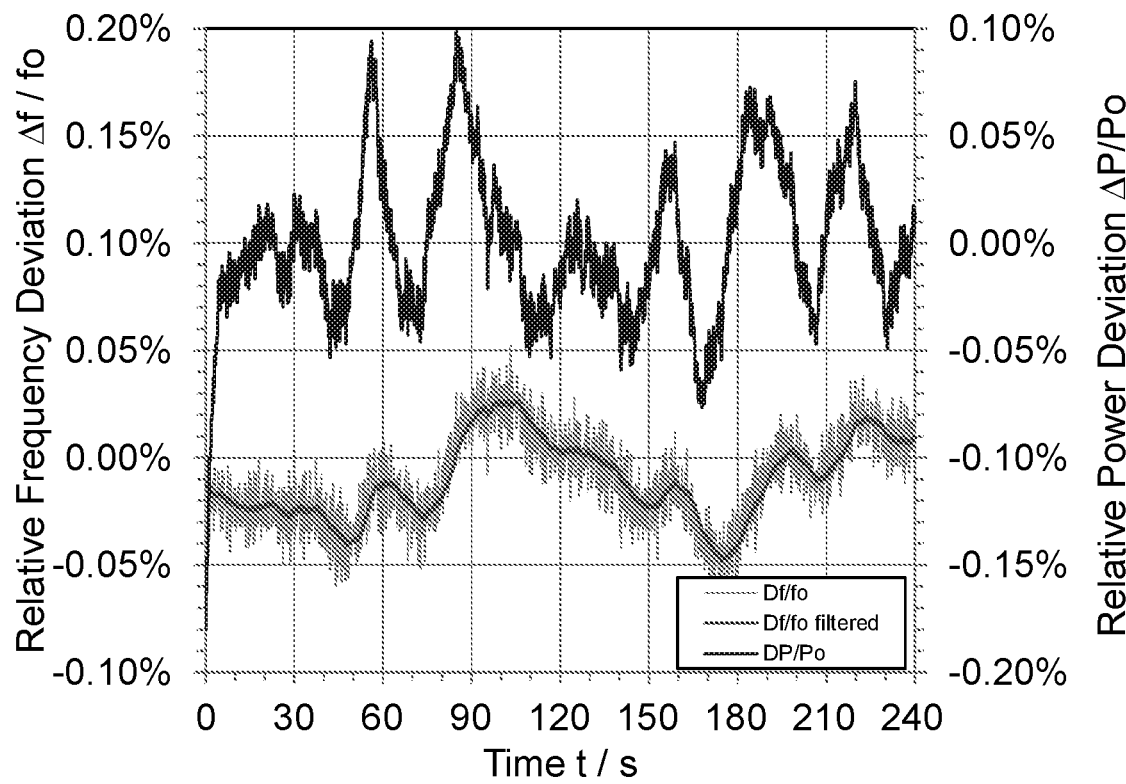
FIG. 9 is a graph illustrating the measured frequency and power deviation of an energy grid over a period of 4 minutes.

FIG. 9 shows the measured frequency (Df/f$_0$) for 4 min on 8.Feb.2014. A simulation using values of one hour was performed as well and led to similar results. Assuming a typical inertia time constant $T_a$=20 s, the required power demand ΔP (Dp/P$_0$) can be calculated from the time derivation of the frequency slope according to Equation 2. The frequency graph has been filtered to achieve workable results (Df/f$_0$ filtered).

It can be seen that the required control power is only a small fraction in the range of less than +/−0.1% of the rated power of the power supply. This shows that the hardware does not need to be changed and can provide the required control power during daily operation.

The voltage fluctuation on the intermediate voltage storage elcap, as an example of energy storage, can be calculated as follows. Generally, the voltage change $\Delta U_C(t)$ on a capacitor C is calculated from the integral of the charging current ΔI(t):

$$\Delta U_C(t) = \frac{1}{C} \cdot \int \Delta I(t) dt \tag{3}$$

This charging current ΔI(t) results from the control power ΔP(t). Assuming a fairly constant capacitor voltage of $U_0$ (which is the intermediate voltage), it is:

$$\Delta P(t) = U_0 \cdot \Delta I(t) \tag{4}$$

Combining the two equations results in:

$$\Delta U_C(t) = \frac{1}{C} \cdot \int \frac{\Delta P(t)}{U_0} dt \tag{5}$$

If Equation (2 is inserted, the integral cancels with the time derivative resulting in:

$$\Delta U_C(t) = \frac{T_a \cdot P_0}{C \cdot U_0 \cdot f_0} \cdot \Delta f(t) \tag{6}$$

Expressing the capacity C by its nominal energy content $E_0$:

$$E_0 = \frac{1}{2} \cdot C \cdot U_0^2 \tag{7}$$

Results in $$\frac{\Delta U_C(t)}{U_0} = T_a \cdot \frac{1}{2} \cdot \frac{P_0}{E_0} \cdot \frac{\Delta f}{f_0} \tag{8}$$

Equation 8 shows that the relative voltage fluctuation $\Delta U_C/U_0$ is directly proportional to the frequency fluctuations $\Delta f/f_0$.

Figure 10:
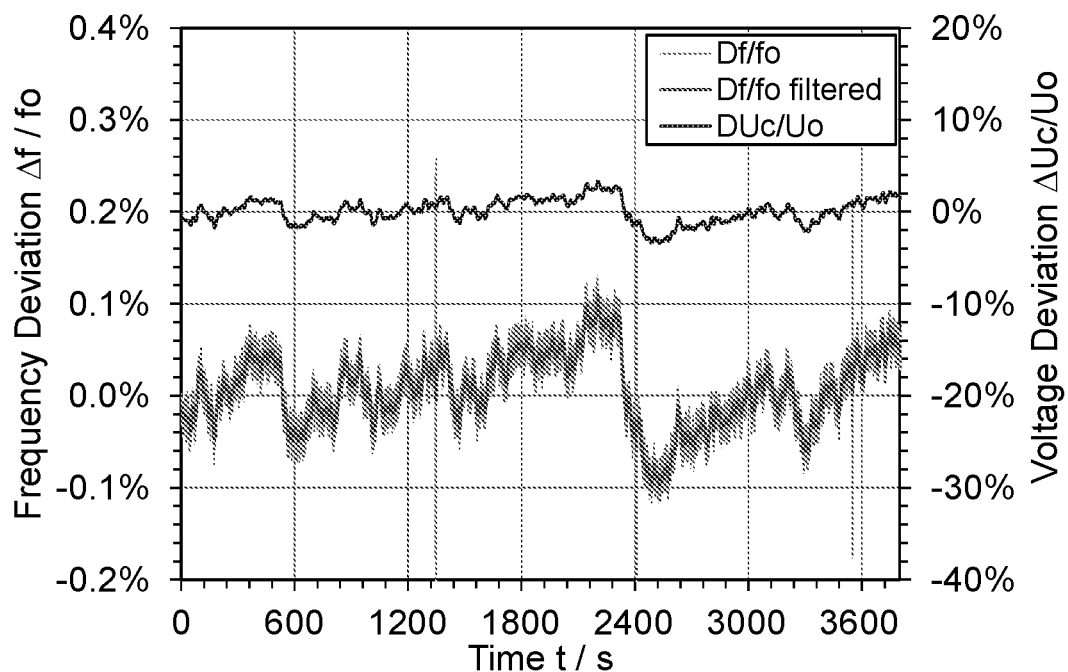
FIG. 10 is a graph illustrating the measured frequency of an energy grid over a one hour period along with the calculated corresponding voltage fluctuation on a capacitor with an energy content of 300 Ws.

The required power is used to charge and de-charge a capacitor with a typical maximum energy content of $E_0$=300 Ws, which relates to charging the DC-link capacitor directly (see above). From this information, the capacitor voltage and its fluctuation can be calculated. The calculated results are shown for one hour on 8.Feb.2014 in FIG. 10 (DUc/U$_0$).

The voltage variation during the investigated time remained between +/−3.4% of the nominal voltage. This value is relatively small and consumer devices implemented with the present invention should easily compensate for these fluctuations. Additionally, this information demonstrates that typical intermediate voltage elcaps, as an example of energy storage, can be used without additional hardware to implement virtual inertia control in power supplies according to the present invention.

The subject invention includes, but is not limited to, the following exemplified embodiments.

Embodiment 1. An electric power supply for an electric load comprising:
a first electric power converter that is suitable for connecting to a power grid;
an energy storage connected to the first electric power converter;
a second electric power converter connected to the energy storage and able to power the electric load;
wherein the first electric power converter is suitable for charging the energy storage using the power grid;
wherein the first electric power converter is controlled, at least in part, by a state variable of the power grid,
and wherein the second electric power converter is controlled, at least in part, by an amount of power required by the electric load.

Embodiment 2. The electric power supply of embodiment 1, wherein the state variable of the power grid is a frequency.

Embodiment 3. The electric power supply according to embodiment 1, wherein the state variable of the power grid is a grid voltage.

Embodiment 4. The electric power supply of any one of embodiments 1-3, wherein the first electric power converter is also suitable for adjusting a current from the grid such that the current has sinusoidal time dependence.

Embodiment 5. The electric power supply of any one of embodiments 1-4, wherein a voltage of the energy storage is controlled to be proportional to the measured grid frequency.

Embodiment 6. The electric power supply of any one of embodiments 1-5, wherein the second electric power converter reduces the power to the electric load if the energy content or voltage of the energy storage falls below a threshold level.

Embodiment 7. The electric power supply of any one of embodiments 1-6 wherein the electrical energy storage is charged from a third electric power converter,
  which is connected to the output of the first electrical power converter,
  and which is controlled to charge or discharge the electrical storage with a power related to the state variable of the power grid.

Embodiment 8. The electric power supply of any one of embodiments 1-7 wherein the electric load is a lamp, motor, or a consumer electronics device.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

EXAMPLE 1

A power supply with virtual inertia may include a power controller, a grid power converter, energy storage, and a load power converter. The power controller measures one or more state variables from the grid (e.g. voltage or frequency) and may also measure the voltage (i.e. the potential energy stored) of the energy storage. The grid power converter is connected to the power grid, rectifies the grid power, provides power factor correction, and charges the energy storage (e.g. an elcap). The load power converter is coupled to the energy storage and provides power to a load.

The power controller may use the measured state variables to determine a change in voltage or frequency over time (i.e. calculate a time derivative). The power controller may use a measured state variable, a time derivative of a measured state variable, or both, as well as the voltage of the energy storage (i.e. the energy storage energy content) to control the grid power converter. The power controller may also use predetermined threshold frequencies, threshold voltages, as well as threshold time derivatives to determine how to control the grid power converter.

In an example applied to an AC grid, a main threshold frequency in Europe may be 50 Hz. When the frequency falls below 50 Hz, the power controller may control the grid power converter to reduce (or taper) power consumption from the grid. When the frequency goes above 50 Hz, the power controller may control the grid power converter to increase power consumption from the grid. If the measured frequency were to drop below a first lower threshold, the grid power converter may actually return power from the energy storage to the grid. While the grid power is stable, the power controller will control the grid power converter to keep the intermediate voltage of the energy storage constant.

The load power converter is coupled to the energy storage and is designed to keep the power to the load constant, regardless of what is happening with the grid power converter and energy storage. However, in some embodiments of the present invention, the power controller may also control the load power converter to reduce power flowing to the load. It is envisioned that this functionality may be applied when the grid is under extreme stress.

EXAMPLE 2

A power supply with virtual inertia may include a power controller, a charge converter, a grid power converter, energy storage, and a load power converter. The power controller measures one or more state variables from the grid (e.g. voltage or frequency) as well as the intermediate voltage. The power controller may also measure the voltage (i.e. the potential energy stored) of the energy storage. The grid power converter is connected to the power grid and provides intermediate power. The load power converter and the charge converter are coupled to the intermediate power.

The power controller may use the measured state variables to determine a change in voltage or frequency over time (i.e. calculate a time derivative). The power controller may use a measured state variable, a time derivative of a measured state variable, or both, in addition to the intermediate voltage and the voltage of the energy storage to control the grid power converter and the charge converter. The power controller may also use predetermined threshold frequencies, threshold voltages, as well as threshold time derivatives to determine how to control the grid power converter and charge converter.

As an example using a DC grid, a main threshold voltage may be 20V. When the voltage falls below 20V, the power controller may control the grid power converter to reduce (or taper) power consumption from the grid. When the voltage goes above 20V, the power controller may control the grid power converter to increase power consumption from the grid. If the measured voltage were to drop below a first lower threshold, the grid power converter may actually return power from the energy storage to the grid. While the grid power is stable, the power controller will control the grid power converter to keep the intermediate voltage constant.

The load power converter is coupled to the intermediate voltage and is designed to keep the power to the load constant, regardless of what is happening with the grid power converter, charge converter, and energy storage. However, in some embodiments of the present invention, the power controller may also control the load power converter to reduce power flowing to the load. It is envisioned that this functionality may be applied when the grid is under extreme stress.

The function of the charge converter is to have greater control of the energy storage. That is, the charge converter can allow the energy storage to operate over a greater voltage range, being able to extract more energy from the energy storage and/or allowing the energy storage to be smaller.

It should be understood that the examples and embodiments described herein are for illustrative purposes only and that various modifications or changes in light thereof will be suggested to persons skilled in the art and are to be included within the spirit and purview of this application. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

[1] A.-C. Agricola, H. Seidl, S. Mischinger, C. Rehtanz, M. Greve, U. Hager, D. Hilbrich, S. Kippelt, A. Kubis, V. Liebenau, T. Noll, S. Rüberg, T. Schlüter, J. Schwippe, C. Spieker, J. Teuwsen, "dena-Studie Systemdienstleistungen 2030—Sicherheit und Zuverlässigkeit einer Stromversorgung mit hohem Anteil erneuerbarer Energien", Deutsche Energie—Agentur GmbH (dena), Energiesysteme und Energiedienstleistungen, Berlin, Germany, February 2014.

[2] Beck, H; Hesse, R.; Turschner, D.; Chen, Y.; Improving the grid power quality using virtual synchronous machines, Proceedings of the International Conference on Power Engineering, Energy and Electrical Drives, May 2011; Torremolinos

[3] Visscher, K.; de Haan, S. W. H.; Virtual synchronous machines for frequency stabilisation in future grids with a significant share of decentralised generation, Proceedings of the CIRED SmartGrids conference; June 2008; Germany

[4] Pedro Rodriguez, "Control of Grid-Interactive Power Converters: The Synchronous Power Controller", Presentation at ECPE-Workshop "Power Electronics in the Electrical Network", Kassel, Germany, 12, Mar. 2013.

[5] Jonathan Brisebois, Noël Aubut, "Wind Farm Inertia Emulation to Fulfill Hydro-Québec's Specific Need", Proceedings of the IEEE PES General Meeting—978-1-4577-1002-5/11 Summer 2011, Jul. 24-28 2011. Detroit, Mich., USA

[6] Chi Kwan Lee, Shu Yuen Ron Hui, "Input AC voltage control bi-directional power converters", US Patent Application US 2013/0322139A1, published 5, Dec. 2013, provisional application 1, Jun. 2012.

[7] Conrad-Elektronik, Electrolytic Capacitors, Internet 6.7.2014: http://www.conrad.de/ce/de/overview/0245812/Elektrolyt-Kondensatoren

[8] Lazar Rozenblat, "The Basics of Active Power Factor Correction", Website, 14, Sep. 2015: http://www.power-factor.us/active.html

We claim:

1. An electric power supply, comprising:
a first electric power converter configured to be connected to a power grid;
an energy storage element connected to the first electric power converter and configured to sense an intermediate voltage from the first electric power converter;
a second electric power converter connected to the energy storage element and configured to provide a constant power to a load; and
a power controller configured to measure at least one state variable of the power grid,
wherein the power controller is configured to control the first electric power converter based upon the at least one measured state variable of the power grid,
wherein the energy storage element is an electrolytic capacitor,
wherein the energy storage element is connected between the first electric power converter and the second electric power converter, and
wherein the power controller is configured to control a power factor correction (PFC) functionality of the first electric power converter.

2. The electric power supply of claim 1, wherein the second electric power converter is configured to increase an input current in response to a drop in the intermediate voltage at the energy storage element.

3. The electric power supply of claim 1, wherein controlling the first electric power converter by the power controller comprises directing an increase or decrease in power drawn by the first electric power converter from the power grid based upon the at least one measured state variable.

4. The electric power supply of claim 1, wherein controlling the first electric power converter by the power controller comprises directing a supply of power to the power grid.

5. The electric power supply of claim 1, wherein the at least one measured state variable of the power grid is a voltage, a frequency, a grid voltage, a grid frequency time derivative, a voltage frequency time derivative, or a change in voltage and/or frequency.

6. The electric power supply of claim 1, wherein the first electric power converter is configured to adjust a current, from the power grid, to have a sinusoidal time dependence.

7. The electric power supply of claim 1, wherein an intermediate voltage of the energy storage element is controlled to be proportional to a measured power grid frequency.

8. The electric power supply of claim 1, wherein the second electric power converter is configured to reduce power to the load if an energy content or a voltage of the energy storage element falls below a threshold level.

9. The electric power supply of claim 1, wherein the load is a lamp, a motor, or a consumer electronics device.

10. An electric power supply, comprising:
a first electric power converter configured to be connected to a power grid and to generate an intermediate voltage;
a second electric power converter connected to the first electric power converter and configured to be connected to a load;
a power controller configured to be connected to the power grid and to measure at least one state variable of the power grid; and
an energy storage element connected to a bi-directional charge converter,
wherein the power controller is configured to control the first electric grid power converter based upon the at least one measured state variable of the power grid,
wherein the energy storage element is an electrolytic capacitor,
wherein the energy storage element and the bi-directional charge converter are connected between the first electric power converter and the second electric power converter, and
wherein the power controller is configured to control a power factor correction (PFC) functionality of the first electric power converter.

11. The electric power supply of claim 10, wherein the bi-directional charge converter is configured to charge or discharge the energy storage element.

12. The electric power supply of claim 10, wherein a power flow of the bi-directional charge converter is controlled by the power controller based upon the at least one measured state variable.

13. The electric power supply of claim 10, wherein the at least one measured state variable of the power grid is a voltage, a frequency, a grid voltage, a grid frequency time derivative, a voltage frequency time derivative, or a change in voltage and/or frequency.

14. The electric power supply of claim 10, wherein the power controller and the first electric power converter are each configured to respectively sense an amount of additional power required for the power grid in response to a change in the load.

15. The electric power supply of claim 10, wherein the second electric power converter is configured to reduce power to the load if an energy content or a voltage of the energy storage element falls below a threshold level.

16. The electric power supply of claim 10, wherein the power controller is configured to independently control the first electric power converter to keep the intermediate voltage constant.

17. A method of providing electric power to a power grid, the method comprising:
- connecting to a power grid the electric power supply according to claim 1;
- measuring, by the power controller of the electric power supply, at least one state variable of the power grid;
- rectifying, by the first electric power converter of the electric power supply, a power of the power grid based upon the at least one measured state variable of the power grid;
- providing, by the first electric power converter of the electric power supply, a power factor correction;
- charging, by the first electric power converter of the electric power supply, the energy storage element of the electric power supply; and
- providing, by the second electric power converter of the electric power supply, power to a load of the electric power supply.

* * * * *